US009258736B2

(12) United States Patent
Xiao

(10) Patent No.: US 9,258,736 B2
(45) Date of Patent: Feb. 9, 2016

(54) BROADCASTING OF DATA FILES AND FILE REPAIR PROCEDURE WITH REGARDS TO THE BROADCASTED DATA FILES

(71) Applicant: Telefonaktiebolaget L M Ericsson (publ), Stockholm (SE)

(72) Inventor: Shiyuan Xiao, Shanghai (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 284 days.

(21) Appl. No.: 13/930,484

(22) Filed: Jun. 28, 2013

(65) Prior Publication Data

US 2014/0010090 A1 Jan. 9, 2014

Related U.S. Application Data

(63) Continuation of application No. PCT/CN2012/078388, filed on Jul. 9, 2012, which is a continuation of application No. PCT/CN2012/079809, filed on Aug. 8, 2012.

(51) Int. Cl.
*H04L 12/26* (2006.01)
*G06F 11/07* (2006.01)
(Continued)

(52) U.S. Cl.
CPC ............ *H04W 28/04* (2013.01); *H04L 1/0035* (2013.01); *H04L 1/0042* (2013.01);
(Continued)

(58) Field of Classification Search
USPC ........................................................ 370/242
See application file for complete search history.

(56) References Cited

U.S. PATENT DOCUMENTS 6,018,519 A * 1/2000 Ginzboorg ................... 370/236
8,429,282 B1 * 4/2013 Ahuja et al. .................. 709/229
(Continued)

FOREIGN PATENT DOCUMENTS

GB          2461516 A    1/2010
WO   WO 2005/078999 A1   8/2005
(Continued)

OTHER PUBLICATIONS

"3$^{rd}$ Generation Partnership Project: Technical Specification Group Services and System Aspects; Multimedia Broadcast/Multicast Service (MBMS); Architecture and functional description (Release 9)," 3GPP TS 23.246, V9.5.0, Jun. 2010.
(Continued)

*Primary Examiner* — Edan Orgad
*Assistant Examiner* — Sithu Ko
(74) *Attorney, Agent, or Firm* — Patents on Demand, P.A.; Brian K. Buchheit; Scott M. Garrett

(57) ABSTRACT

A method in a Broadcast Multicast Service Center, BM-SC, comprising at least two file repair servers is arranged for performing a file repair session following a broadcast transmission of a data file to a User Equipment, UE, in a radio communication system. After having determined whether a first of the file repair servers is experiencing, or is predicted to experience, an overload condition, an information message, indicating the existing or predicted overload experience of the first file repair server and capable of indicating a time interval, T, which shall have elapsed before the UE is allowed to transmit a file repair request to the first file repair server, is transmitted to the UE in case it is determined that the first file repair server is experiencing, or is predicted to experience, an overload condition.

31 Claims, 10 Drawing Sheets

(51) Int. Cl.

| | |
|---|---|
| *H04W 28/04* | (2009.01) |
| *H04L 1/08* | (2006.01) |
| *H04W 4/06* | (2009.01) |
| *H04L 1/00* | (2006.01) |
| *H04L 1/18* | (2006.01) |
| *H04L 1/22* | (2006.01) |
| *H04L 12/18* | (2006.01) |
| *H04W 72/00* | (2009.01) |

(52) U.S. Cl.
CPC .............. *H04L 1/0043* (2013.01); *H04L 1/08* (2013.01); *H04L 1/1887* (2013.01); *H04L 1/22* (2013.01); *H04L 12/1886* (2013.01); *H04W 4/06* (2013.01); *H04W 72/005* (2013.01)

(56) References Cited

U.S. PATENT DOCUMENTS

| | | | |
|---|---|---|---|
| 2005/0198285 A1* | 9/2005 | Petit | 709/225 |
| 2007/0121515 A1* | 5/2007 | Donovan et al. | 370/236 |
| 2007/0211720 A1 | 9/2007 | Fuchs | |
| 2010/0050032 A1* | 2/2010 | Bichot et al. | 714/746 |
| 2012/0151261 A1 | 6/2012 | Suneya | |

FOREIGN PATENT DOCUMENTS

| | | |
|---|---|---|
| WO | WO 2005/114384 A2 | 12/2005 |
| WO | WO 2006/024948 A2 | 3/2006 |
| WO | WO 2008/107830 A2 | 9/2008 |

OTHER PUBLICATIONS

"Content delivery verification in MBMS," Nokia, Tdoc S4-AHP158, Oct. 2004, 5 pages.
"Point-to-point repair for MBMS downloading," Nokia, Tdoc S4-040092, Feb. 2004, 6 pages.
"Point-to-point repair mechanism for MBMS file download service," NTT DoCoMo Inc., T-doc S4-040038, Feb. 2004, Section 2, 3 pages.
"Scalable point-to-point repair for MBMS downloading," Nokia, Tdoc S4-AHP110, Apr. 2004, 6 pages.
"Universal Mobile Telecommunications Systems (UMTS); LTE; Multimedia Broadcast/Multicast Service (MBMS); Protocols and codecs," 3GPP TS 26.346 version 9.5.0 Release 9, Jan. 2012.
Extended European Search Report, EP Application No. 13817289.5, Jul. 9, 2015, 10 pages.
International Search Report, PCT/SE2013/050395, Aug. 19, 2013, 3 pages.
International Search Report, PCT/SE2013/050660, Feb. 14, 2014, 5 pages.
Written Opinion of the International Searching Authority, PCT/SE2013/050395, Aug. 19, 2013, 6 pages.
Written Opinion of the International Searching Authority, PCT/SE2013/050660, Feb. 14, 2014, 7 pages.

* cited by examiner

BROADCASTING OF DATA FILES AND FILE REPAIR PROCEDURE WITH REGARDS TO THE BROADCASTED DATA FILES

CROSS REFERENCE TO RELATED APPLICATION

The present application is a continuation of PCT International Application No. PCT/CN2012/078388, filed Jul. 9, 2012, and PCT International Application No. PCT/CN2012/079809 filed Aug. 8, 2012, the disclosures of both of which are hereby incorporated herein by reference as if set forth fully herein.

TECHNICAL FIELD

The present disclosure relates to Broadcast Multicast Service Centres, BM-SCs, methods therein, User Equipments, UEs, and methods therein for broadcasting data files while applying a file repair procedure with regards to the broadcasted data files.

BACKGROUND

Multimedia Broadcast and Multicast Services, MBMS, is a broadcasting service offered via cellular networks. Enhanced MBMS (eMBMS) is used to denominate MBMS service in Evolved Packet Systems including Evolved Universal Terrestrial Radio Access Network, E-UTRAN, for Long Term Evolution (LTE), cellular networks and UTRAN for e.g. Universal Mobile Telecommunications System (UMTS) cellular networks. One example of an eMBMS over LTE solution architecture is illustrated in FIG. 1. The architecture 100 of FIG. 1 comprises at least one Broadcast Multicast Service Center (BM-SC) 110, which is capable of distributing content provided from one or more content service providers 120, where a content service provider 120 typically comprise a content store (not shown) and a live encoder (not shown) capable of providing content feeds e.g. in the form of satellite feeds, live feeds and/or Content Delivery Network (CDN) feeds, to the BM-SC 110 under supervision of a Broadcast operations function 130, which is typically capable of interacting with the BM-SC 110. The BM-SC 110 is connected to an access network, typically comprising a plurality of access nodes, but for simplicity here represented by one single access node, eNB 140, via a Multimedia Broadcast Multicast Services Gateway (MBMS-GW) 150, where the eNB 140 is capable of distributing the provided content feeds to User Equipments (UE) located within range of the access network, via unicast or multicast. Here such UEs are represented by one single UE, UE 160.

In order to be able to remedy failure to receive the content feeds correctly at at least one of the UEs, the architecture is typically also provided with functionality, enabling the BM-SC 110 to re-transmit parts of the content feeds to those UEs 160 reporting failure to receive at least parts of the content feeds. Such a feature is typically referred to as File repair, or more specifically HTTP Unicast File repair. For enabling file repair, the BM-SC 110 is therefore normally provided with at least one, but typically with a plurality of file repair servers (not shown), capable of providing lost or corrupted file fragments of the content feeds to requesting UEs, by way of re-transmission.

The purpose of a file repair procedure is to repair lost or corrupted file fragments, packets or symbols from the MBMS download data file broadcast transmission. When in multicast/broadcast environment, scalability becomes an important issue as the number of UEs, grows. From hereinafter UEs may also be referred to as MBMS clients, since the mentioned UEs are restricted to UEs capable of handling MBMS and/or EMBMS. Three problems should generally be avoided when applying file repair:

- Feedback implosion due to a large number of UEs requesting simultaneous file repairs. This would congest the uplink network channel.
- Downlink network channel congestion to transport the repair data, as a consequence of the simultaneous MBMS clients' requests.
- File repair server overload, caused again by the incoming and outgoing traffic due to the clients' requests arriving at the server, and the server responses to serve these repair requests.

In order to avoid file repair server overload, $3^{rd}$ Generation Partnership Project, 3GPP TS 26.346 proposes two methods:

- Spread the file repair request load in time. The MBMS client calculates a random back-off time. The sending of the file repair request message from the UE to a file repair server shall start at Back-off Time=offset-time+Random Time. The UE shall calculate a uniformly distributed Random Time out of the interval between 0 and Random Time Period. The random time period is indicated by a randomTimePeriod parameter in an Associated Delivery Procedure Description, (ADPD) sent from BM-SC to UEs
- Spread the file repair request across multiple file repair servers. A list of file repair service URIs is provided as elements of the Associated Delivery procedure fragment's postFileRepair element. The MBMS client randomly selects one of the service URIs from the list, with uniform distribution.

A typical lifecycle of one file repair procedure is illustrated in FIG. 2. When one file repair procedure is triggered, UEs may send file repair (FR) requests in a time slot decided by randomTimePeriod 210, following an offset time 200.

When a UE creates a HTTP connection and sends a file repair request to a file repair server via this connection which may arrive during time interval 220, the connection will be kept for some time, defining the complete file repair procedure 230, allowing the UEs to download symbols, or repair symbols, from the file repair server.

Consequently, after the randomTimePeriod 210, no UE will send FR requests but some FR connections will be kept until the UEs have downloaded all the repair symbols they need.

3GPP TS 26.346 V9.5.0: MBMS Protocols and codecs and 3GPP TS 23.246 V9.5.0: MBMS Architecture and functional description have both proposed how to spread the traffic of single file repair procedure in time and across multiple servers. But the file repair servers still may be overloaded because of extreme bad LTE network situation and file repair burst traffic caused by multiple file repair procedures which have time overlap.

In FIG. 3, there are two file repair procedures 300 and 310 illustrated for two different data file download sessions which have part time overlap. As a UE calculates a uniformly distributed random time to send file a repair request for a file repair procedure, the resulting traffic 320 (file repair requests per second) of file repair procedure 300 or 310 should be uniformly distributed in time. But the total traffic increases twice in the overlapped time slot, i.e., the burst traffic happens in the time slot when the two file repair procedures are time overlapped, as is illustrated with resulting traffic 320.

The more file download sessions that are being delivered, the more file repair procedures may have this type of time overlap and the more extreme burst traffic may happen. There are some ways for operators to handle burst traffic. One way is to schedule the file repair procedures for each file download carefully to avoid time overlap. This way has two obvious shortcomings: a) increase the difficulty of scheduling (sometime it is even impossible if there are too many concurrent file downloads and file repair procedure is quite long); b) file repair server resource waste because the ratio of MBMS clients which need file repair and the ratio of symbol loss may vary quite differently. Another way is to deploy enough file repair servers to service extreme burst traffic. Obviously this way will, however, bring high file repair server resource waste.

When file repair servers are overloaded, they will respond to a FR request by sending an HTTP 503 response, also referred to as service unavailable or service not available, to the UEs. Unfortunately other UEs do not know that the file repair servers are overloaded and keep sending FR requests.

The UEs who receive the HTTP 503 response may retry sending a FR request after some time but they don't know how long time they should wait. If they retry according to a configured time, they may receive a HTTP 503 response again because the file repair servers may still be overloaded.

As mentioned above, there are a plurality of problems that may arise due to UEs sending file repair requests.

SUMMARY

The present disclosure is set to solve or reduce at least some of the problems outlined above, wherein according to a first aspect a method in a BM-SC, comprising at least two file repair servers for performing a file repair session following a broadcast transmission of a data file to a UE, in a radio communication system, is provided. According to this method it is determined whether a first of the file repair servers is experiencing, or is predicted to experience, an overload condition, and, in case it is determined that the first file repair server is experiencing, or is predicted to experience, an overload condition, an information message indicating the existing or predicted overload experience of the first file repair server and capable of indicating a time interval, T, which shall have elapsed before the UE is allowed to transmit a file repair request to the first file repair server, is transmitted to the UE. Thereby the BM-SC will be able to prohibit the UE from requesting services from an unsuitable file repair server until the file repair server is a more suitable choice.

According to a second aspect, a method in a UE, for performing a file repair session following a broadcast transmission of a data file from a BM-SC is suggested. In this method an information message, capable of indicating a time interval, T, which shall have elapsed before the UE transmits a file repair request to a first file repair server of the BM-SC is received from the BMSC at the UE, wherein the UE determines based on T, when to transmit a file repair request to the first file repair server. Thereby, the UE will be provided with information on the basis of which the UE can determine which file repair server to request services from.

According to a third aspect, a BM-SC, comprising at least two file repair servers, configured to perform a file repair session following a broadcast transmission of a data file to a UE, in a radio communication system is provided. The BM-SC comprises a processing unit which is configured to: determine whether a first of said file repair servers is experiencing, or is predicted to experience, an overload condition, and to transmit, via a transmitting unit, to the UE, an information message indicating the existing or predicted overload experience of the first file repair server and capable of indicating a time interval, T, which shall have elapsed before the UE is allowed to transmit a file repair request to the first file repair server, in case it is determined that the first file repair server is experiencing, or is predicted to experience, an overload condition.

According to a fourth aspect a UE for performing a file repair session following a broadcast transmission of a data file from a BM-SC, the UE is provided. The UE comprises a processing unit which is configured to receive, from the BM-SC, via a receiving unit, an information message capable of indicating a time interval, T, which shall have elapsed before the UE transmits a file repair request to a first file repair server of the BM-SC, and to determine, based on T, when to transmit a file repair request to the first file repair server.

According to a fifth aspect, a computer program for performing a file repair session following a broadcast transmission of a data file to a UE, is provided, where the computer program comprise computer readable code units which when run on a computer causes the computer to: determine whether a first of said file repair servers is experiencing, or is predicted to experience, an overload condition, and to transmit, via a transmitting unit, to the UE, an information message indicating the existing or predicted overload experience of the first file repair server and capable of indicating a time interval, T, which shall have elapsed before the UE is allowed to transmit a file repair request to the first file repair server, in case it is determined that the first file repair server is experiencing, or is predicted to experience, an overload condition.

According to a sixth aspect a computer program product may also be provided, where the computer program product comprise computer readable medium and a computer program, such as the one suggested above, and stored on the computer readable medium.

Correspondingly, according to an eighths aspect a computer program for performing a file repair session following a broadcast transmission of a data file from a BM-SC is provided, where the computer program comprise computer readable code units which when run on a computer causes the computer to: receive, from the BM-SC, via a receiving unit, an information message capable of indicating a time interval, T, which shall have elapsed before the UE transmits a file repair request to a first file repair server of the BM-SC, and to determine based on T, when to transmit a file repair request to the first file repair server.

According to a ninth aspect a computer program product is provided, where the computer program product comprise computer readable medium and a computer program, such as the one described above according to the eights aspect, and stored on the computer readable medium.

BRIEF DESCRIPTION OF DRAWINGS

Embodiments will now be described in more detail in relation to the accompanying drawings, in which.

DETAILED DESCRIPTION

An object of the present document is to predict file repair traffic of one file repair procedure or session for its whole lifecycle and to use this prediction to optimize file repair traffic in the future in order to avoid that file repair servers become overloaded without server resource waste and special requirements for scheduling of a data file download eMBMS session.

A BM-SC may collect traffic statistics during a predetermined time window at the beginning of a file repair procedure. The BM-SC may then estimate the variation of traffic for future file repair procedures according to a specific traffic model, such that the BM-SC may estimate if an overload situation is likely to happen or not.

An example of a method for predicting file repair traffic of one file repair procedure or session for its whole lifecycle comprises sampling traffic statistics data within a short time at the beginning of a file repair procedure and predicting how the total traffic of these file repair procedures will vary in future. The way to predict the variations of the total traffic of the file repair procedures or sessions will be described in more detail below.

Figure 8A:
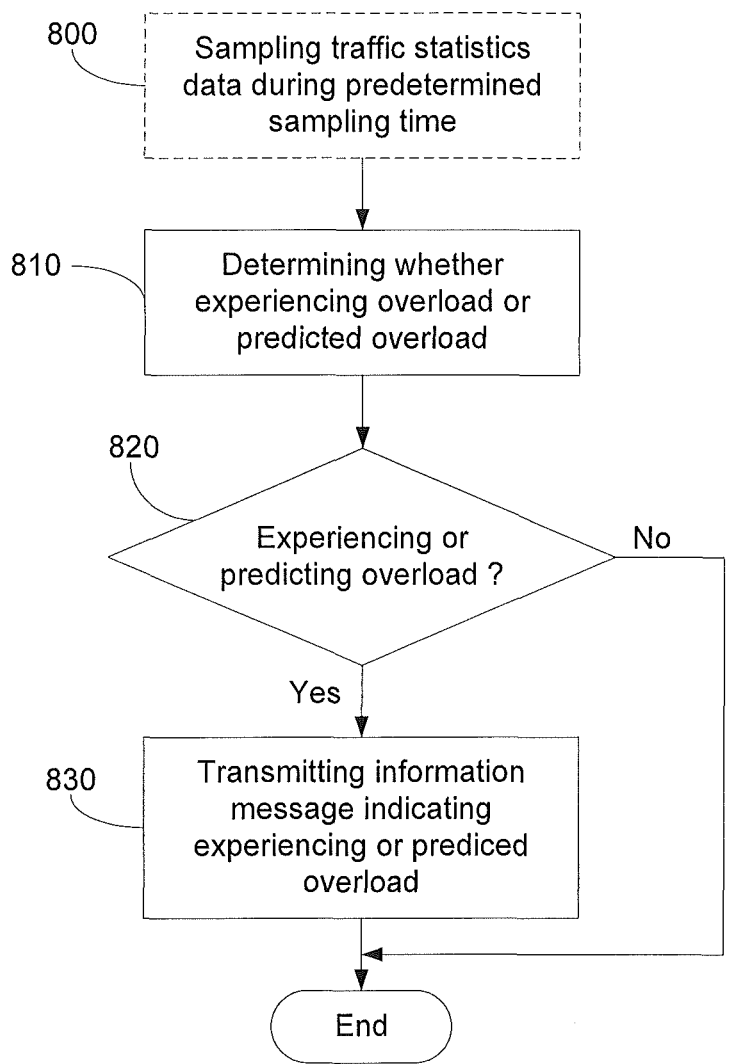
FIG. 8a is a flowchart of a method in a BM-SC for performing a file repair session following a broadcast transmission of a data file to a UE, in a radio communication system, according to a first embodiment.

A method to be executed in a BM-SC, or in a network unit capable of executing corresponding functionality, which comprises at least two file repair servers for performing a file repair session following a broadcast transmission of a data file to UEs requesting file repair, is illustrated in FIG. 8a. In step 810 and 820 it is determined whether a first file repair server of the BM-SC is experiencing, or is predicted to experience, an overload condition. If a file repair server is already experiencing overload condition, this can easily be identified, since file repair servers typically form part of a BM-SC. As indicated with an initial step 800, predicting may be based on traffic statistics data sampled during a predetermined sampling time according to any known sampling method.

If it is determined that the file repair server is experiencing or predicting overload, an information message, indicating an existing or a predicted overload experience of this file repair server is transmitted to the UE, as indicated in step 830. The information message also comprises a time interval, T, which shall have elapsed before the UE is allowed to transmit a file repair request to the file repair server. Alternatively, instead of a time interval, the information message may instruct the UE not to request the overloaded, or about to become overloaded, file repair server.

If the BM-SC supports file repair overload prevention it can, according to the suggested method, predict that at least one file repair server of the BM-SC will be overloaded at a certain point in time, the BM-SC may therefore send an updated ADPD with new offsetTime and randTimePeriod to UEs to extend the file repair procedure or session to avoid an overload situation of the file repair servers.

Below follows some definitions of different terms used in this disclosure.

Client FR bitrate: The maximum unicast bitrate that the UE or MBMS client can use to download symbols from file repair servers for file repair. This depends on UE capability and operator's LTE network.

Total FR bandwidth: The total bandwidth provided by an operator for data file repair servers.

Maximum used FR bandwidth: The maximum actually used bandwidth for one data file repair procedure or session. FR is short for File Repair.

FR user number: Number of users who need to apply file repair for data file download.

FR request per second: Number of file repair requests of one data file download that file servers receive every second.

FR connection number: The number of concurrent file repair HTTP connections between UEs or MBMS clients and file repair servers for one data file download.

Maximum FR connection number: The maximum value that the number of FR connections ever reaches during one file repair procedure or session. In other words the maximum number of UEs or MBMS clients ever involved in one data file repair session.

FR connection threshold: The maximum number of concurrent file repair connections, i.e. UEs or MBMS clients, that the file repair servers can serve simultaneously. If the number of FR connections exceeds this value, the file repair servers may, or will, be overloaded.

File loss ratio: Ratio of symbols in one data file which needs to be fetched from the file repair server using a file repair procedure or session.

Total size of downloaded symbols: The total size of symbols downloaded by all UEs or MBMS clients in one file repair procedure or session.

File loss ratio and packet loss ratio both refer to a ratio of symbols in one data file which are lost during a broadcast transmission and subsequently need to be fetched from the file repair server(s) by means of a file repair procedure or session.

Figure 1:
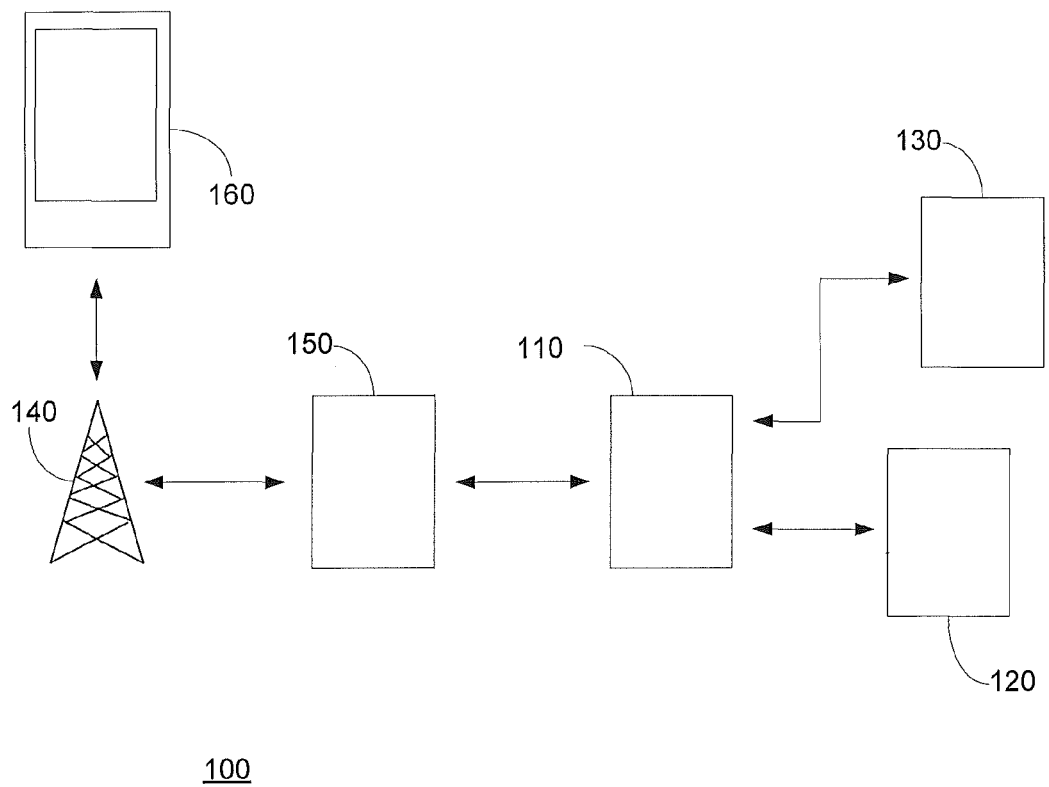
FIG. 1 is an architectural overview of an eMBMS enabled LTE cellular network, according to the prior art.
Figure 2:
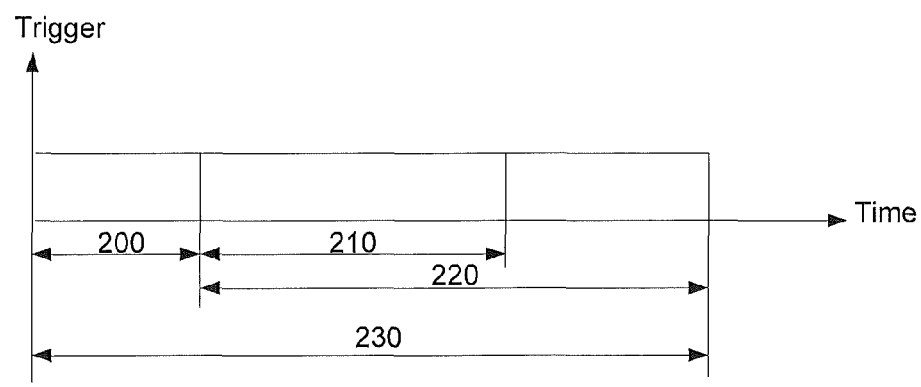
FIG. 2 illustrates a file repair session life cycle, according to the prior art.
Figure 3:
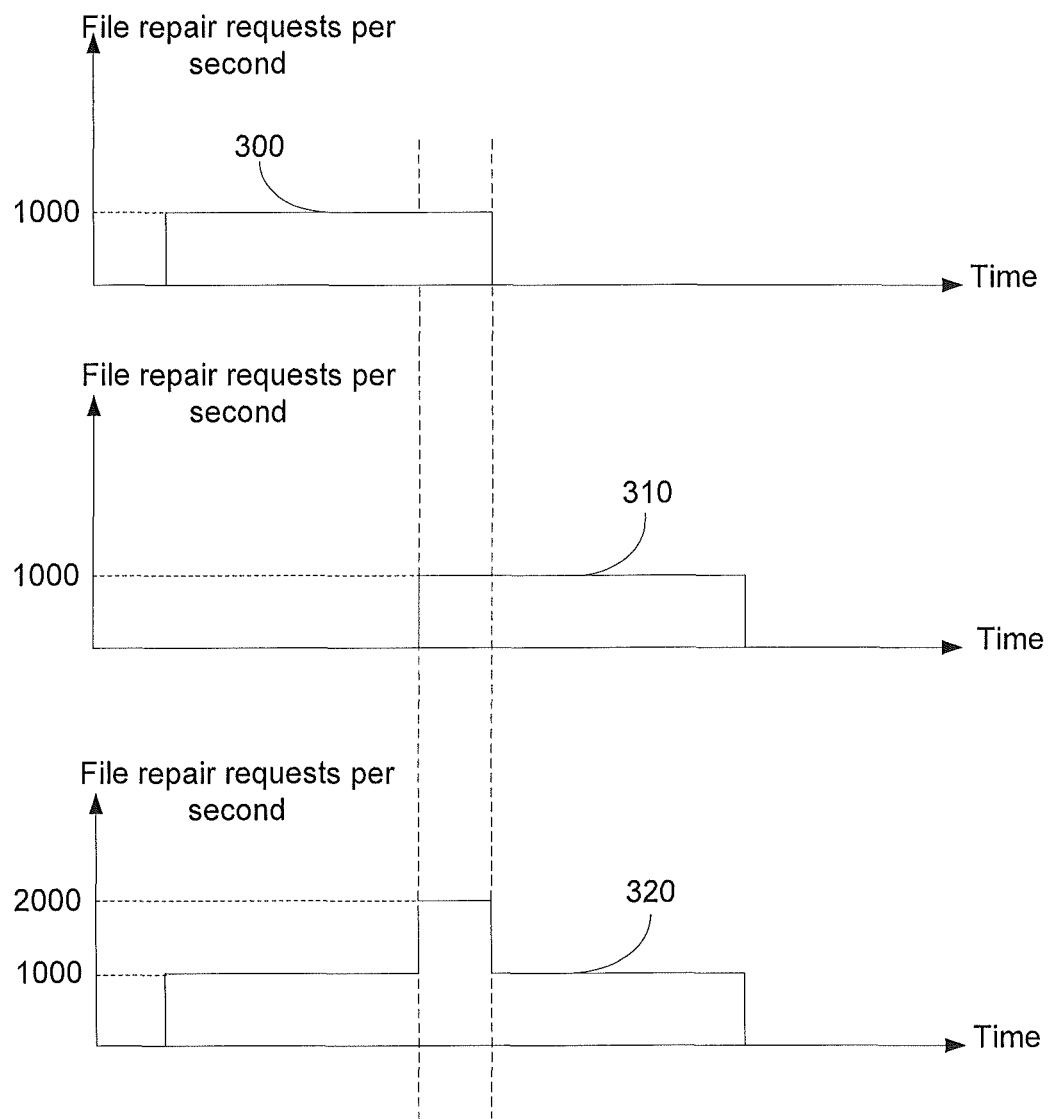
FIG. 3 illustrates a scenario of a file repair process with an overlap in time due to file repair burst traffic, according to the prior art.
Figure 4:
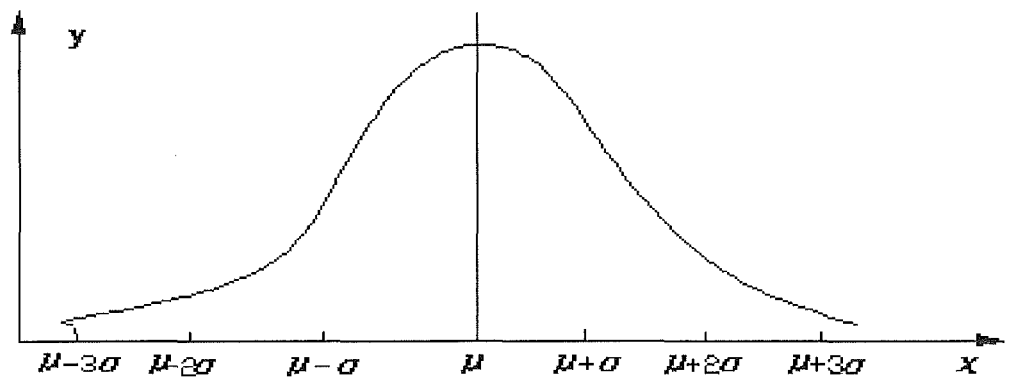
FIG. 4 is illustrating an exemplifying scenario of a normal distribution of a Gaussian distribution for a file loss ratio.

The file loss ratio of UEs that have not downloaded a complete file successfully normally satisfies normal distribution (Gaussian distribution)

$$f(x) = \frac{1}{\sqrt{2\pi}\sigma} e^{\frac{(x-\mu)^2}{2\sigma^2}}$$

which is shown in FIG. 4. The x axis represents a file loss ratio and the y axis represents the likelihood that one UE has such file loss ratio. μ presents the file loss ratio which most of the UEs get. If the FR user number is n, then the number of UEs that have file loss ratio x is n*f(x).

Figure 5:
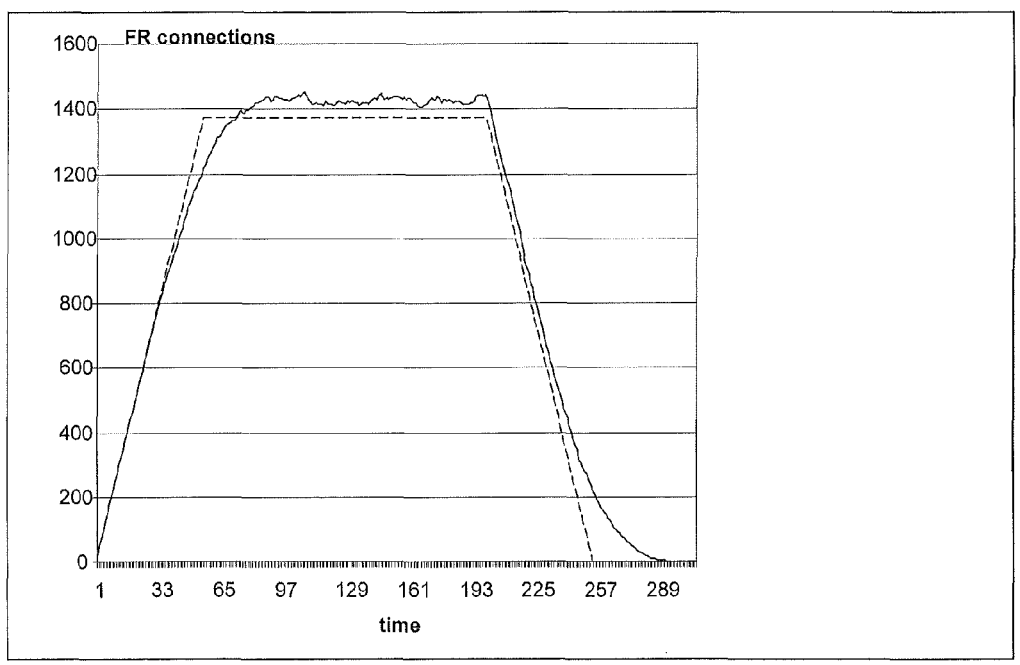
FIG. 5 is a graph illustrating a simulation of a plurality of FR connections of one file repair procedure or session.

In FIG. 5, an example of file loss ratio with normal distribution is illustrated. The continuous curve shows how FR connections of one file repair procedure or session may vary with the following conditions: File size=300 Mbytes; Client FR bitrate=0.5 Mbps; total FR bandwidth=3000 Mbps; FR user number=5000; FR request per second=25; randomTimePeriod=200 seconds. The file loss ratio of UEs satisfies normal distribution with μ=0.012, σ=0.004, i.e., the maximum file loss ratio is 1.2%.

For σ=0.004, it can be shown that more than 99.9% of the UEs' file loss ratio is located in the range specified by [μ−3σ, μ+3σ] and the file loss ratio can't be minus. Hence it is assumed that μ−3σ is equal to the minimum file loss ratio 0, then it is possible to use σ=μ/3=0.012/3=0.004 instead of a real value approximately.

The continuous curve is calculated by way of simulations and it is known that the total size of downloaded symbols of all users is equal to 140000 Mbits and the average file loss ratio is 1.167%.

If assuming that all UEs have the same file loss ratio for one file download and that this file loss ratio is equal to the average file loss ratio of the continuous curve, then a file loss ratio of 1.167% illustrated by the dashed curve shown in FIG. 5 may also be obtained by way of simulation.

When comparing the continuous curve and the dashed curve, it can be seen that they are very similar. Consequently, it is possible to use a traffic model with basically the same file loss ratio for all users as a mathematical approach for real traffic and thus to predict real traffic in a simple way.

In this disclosure, only one simulation example is illustrated. However, the conclusions drawn from this simulation is valid for other simulations as well.

Certain parameters are known before a FR procedure or session is initiated. These parameters may also be present in the ADPD.

1) Statistic time for sampling traffic data (c1) (e.g. 5 seconds),
2) File size (c2),
3) randomTimePeriod (c3),
4) total FR bandwidth (c4), and
5) FR connection threshold (c5).

At the beginning of one file repair procedure or session, the following traffic data should be obtained after reception of some file repair requests:

1) FR requests per second (d1),
2) Average file loss ratio (d2), and
3) Average UE FR bitrate (d3).

For the same file repair procedure or session, its file repair requests may be spread over multiple file servers with unique distribution, e.g. according to 3GPP TS 26.346 V9.5.0: MBMS Protocols and codecs.

Figure 6:
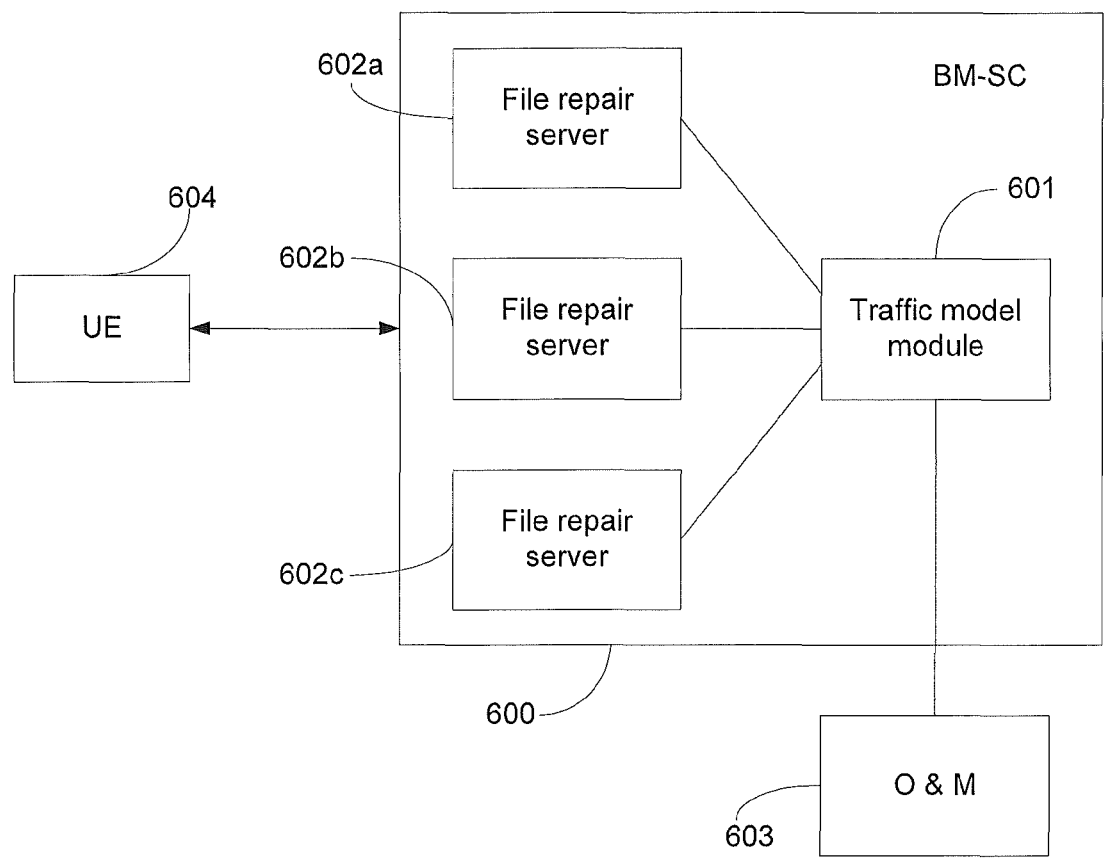
FIG. 6 is a simplified block scheme illustrating a BM-SC, comprising a traffic module and a plurality of file repair servers.

In FIG. 6, which is a simplified block scheme of a BM-SC 600, a centralized traffic model module 601 is configured to sample traffic data from each of a plurality of file repair servers 602a,602b,602c of the BM-SC; predict a traffic trend; give feedback to each file repair server 602a,602b,602c and raise an alarm to an operations and maintenance center (O & M) 603, once the traffic model module 601 predicts an overload. For one file repair procedure, each file repair server should log its traffic data separately.

When a statistics time c1 has passed, a traffic model module will send a HTTP request to each file repair server immediately to get the traffic logged. An example of a file repair request, here provided as an HTTP request and an HTTP response is given below.

```
HTTP request:
    GET: http://frserver1/logging&
    fileRepairServiceId=xxx&statisticsTime=C1
HTTP response:
    HTTP/1.1 200 OK
    Host: frserver1
    Date: Tue, 22 DEC 2011 13:14:15 -0600
    Content-Type: application/xml
    Content-Length: xxx
    <trafficModel version="1.0">
        <requestCount>1000</requestCount>
        <totalLoss>30000000<totalLoss >
        <totalDownloaded>10000000< totalDownloaded >
    </ trafficModel>
```

In the HTTP request, a file repair service id and statistics time c1 are sent to the file repair server. According to the file repair service id and c1, the file repair server will respond with related traffic data.

In the HTTP response, requestCount indicates the number of file repair requests which are received in time c1. totalLoss (counted in bytes) indicates the number of symbols which are lost totally according to the received file repair requests, i.e., how many symbols that are to be fetched by these file repair requests. totalDownloaded (counted in bytes) indicates the number of symbols which have been downloaded by file repair procedure/service.

After the traffic data has been received from each file repair server, it is possible to calculate d1, d2 and d3, as specified below, for a specific file repair procedure or session. Assuming there are n file repair servers, then d1, d2 and d3 are defined as follows:

$$d1 = \left(\sum_{1}^{n} requestCount\right) / c1$$

$$d2 = \left(\sum_{1}^{n} totalLoss\right) / (n \cdot c2),$$

and $$d3 = \left(\sum_{1}^{n} (totalDownloaded/(requestCount \cdot c1))\right) / n$$

Since the file repair requests arrive with uniform distribution in randomTimePeriod, the d1, d2 and d3 sampled in c1 should be the same in randomTimePeriod if the sampling error is ignored.

According to the discussed traffic model, if the average file loss ratio d2 is used for all users, then the following results may be obtained by the following calculations:

1) FR user number (r1): r1=d1*c3/c1
2) The time reaching maximum FR connection number (r2): r2=c2*d2/d3
3) Maximum FR connection number (r3): r3=r2*d1= (c2*d2/d3)*d1
4) Maximum used FR bandwidth (r4): r4=r3*d3=c2*d2*d1

Figure 7:
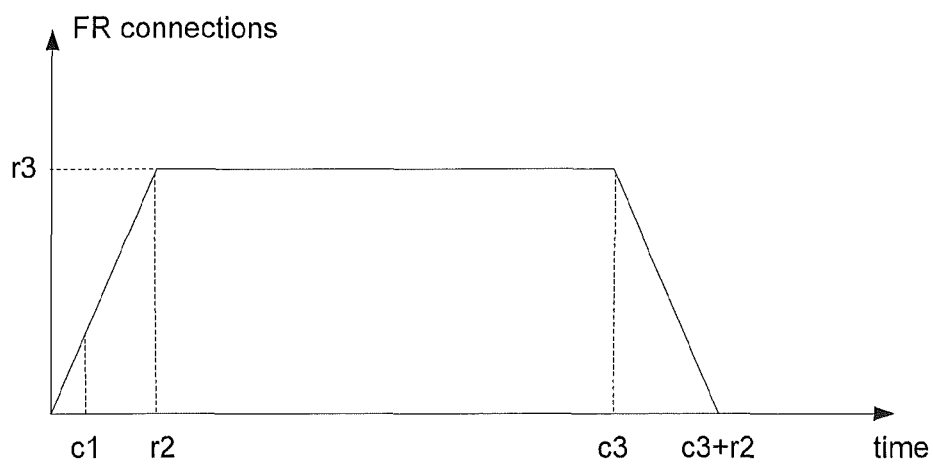
FIG. 7 is a graph illustrating an example of a number of file repair connections over time.

FIG. 7 is a simplified model of FR connections as a function of time.

If r4>c4, it is likely that at least one of the file servers will be overloaded due to bandwidth limitations at the time r5=c4/(d1*d3). Then the calculated file repair traffic curve as illustrated in FIG. 7 may be obtained to predict the real traffic approximately.

The prediction algorithm may be used in a plurality of ways in order to predict a possible overload of the file repair servers, or at least one of the file repair servers, and possibly also at which point in time the overload might occur. The file repair servers may be overloaded due to the file repair procedure or session due to any of the three following cases:

1) The number of FR requests per second exceeds a threshold,
2) The total used FR bandwidth exceeds a threshold, or
3) The maximum number of FR connections exceeds a threshold.

It shall be pointed out that the three thresholds in the different cases suggested above are individual and may take different values. For overload case (1), the number of FR requests per second may be derived at the beginning of the file repair procedure or session, for example, by sampling the traffic load with regards to file repair request at the beginning of the file repair procedure or session. Whether the number of FR requests per second exceeds a threshold or not may actually be performed without prediction, or the prediction may be said to comprise sampling of the traffic load with regards to file repair request at the beginning of the file repair procedure or session and by comparing the number of FR requests per second with the threshold.

For overload case (2), whether the total used FR bandwidth exceeds a threshold or not may be determined based on the result of r5−c1.

For overload case (3), whether the maximum number of FR connections exceeds a threshold or not may be determined based on the result of r2−c1.

If it is possible to predict that the overload may, or will, happen in advance, there is time to send an updated ADPD with a new offsetTime and randomTimePeriod to the UEs to avoid overload before an overload really happens.

All UEs that have received the updated ADPD should calculate a backoffTime=offsetTime+randomTimePeriod again and send a FR request anew according to the new backoffTime.

For overload case (2), one example comprises setting the offsetTime and randomTimePeriod with these new values: offsetTime=0 and randomTimePeriod=r1*(c2*d2)/c4 (Total symbols to be downloaded by all users can be downloaded in randomTimePeriod with total FR bandwidth c2).

For overload case (3), one example comprises setting the offsetTime and randomTimePeriod with these new values: offsetTime=0 and randomTimePeriod=r1*r2/c5.

Two examples of sending or transmitting the updated ADPD are:

1) Sending in-band updated ADPD if the MBMS session is kept during the file repair procedure (usually the MBMS session will be kept if it trends to keep sending a lot of files serially), and
2) Sending out-band updated ADPD to UEs during file repair procedure by SDCH (Service Discovery Channel) or via unicast.

Preferably, the traffic model module should send an alarm to the O&M if an overload can be predicted, regardless of whether the system supports sending updated ADPD or not.

Figure 8B:
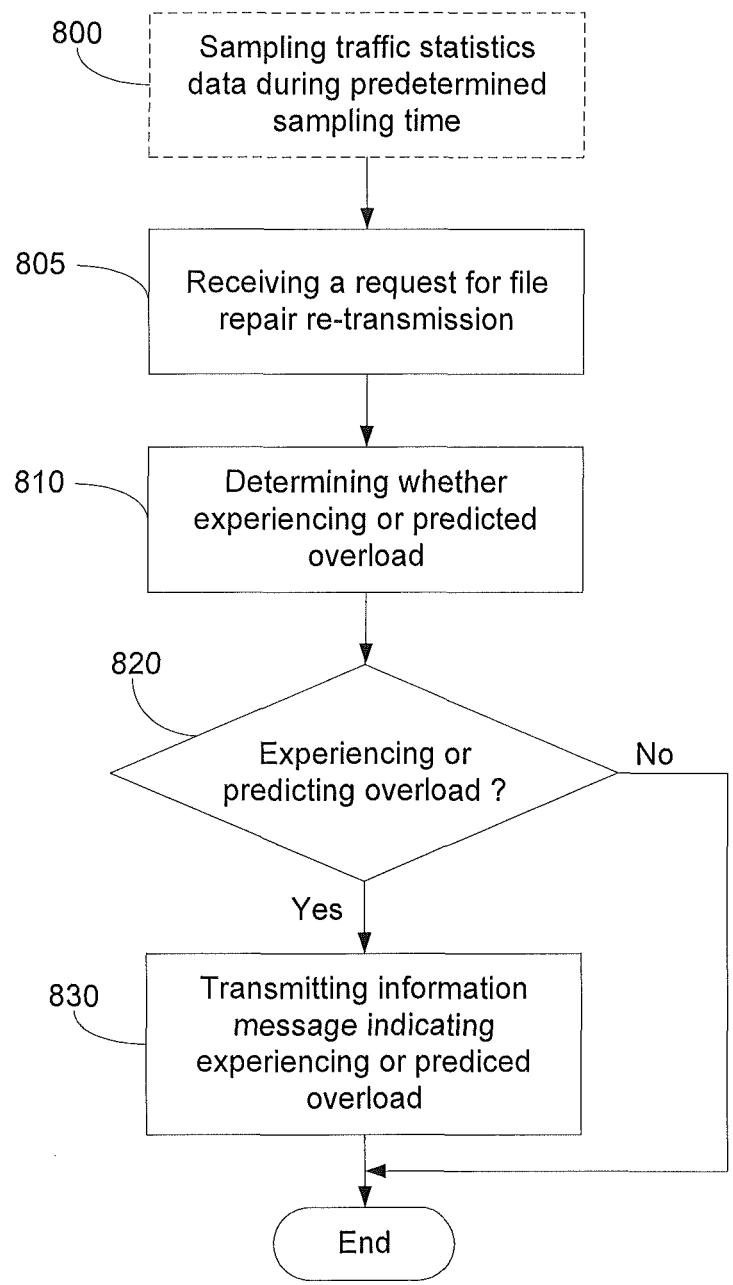
FIG. 8b is a flowchart of a method in a BM-SC for performing a file repair session following a broadcast transmission of a data file to a UE, in a radio communication system, according to a second embodiment.

The prediction algorithm described above may also be used for UE retry, i.e. when a UE makes a repeated attempt to request re-transmission from a file repair server of a BM-SC. For some eMBMS systems, there may be no mechanism to send updated ADPDs to UEs to avoid overload. In such a situation the UEs will instead receive a HTTP response with a 503 error code, including a time period T, which may be referred to as a retry time, after a prediction of, or determination of overload, in response to a file repair request. The retry time T will enable the UE to retry the current file repair server after T has elapsed. If a file repair server does not allow a UE to retry, i.e. to request the same file repair server once again, it may set the retry time T to 0, or remove the retry time element from the HTTP 503 response. Such a method is illustrated in FIG. 8*b*, which differs from FIG. 8*a* in that step 810 is preceded by step 805, indicating the reception of a request for file repair re-transmission at the BM-SC, addressing one of the file repair servers of the BM-SC. According to FIG. 8*b* the information message sent in step 830 is a response to the file repair re-transmission request which may be configured as a HTTP 503 response.

In case the file repair server is, or is about to, experiencing an overload condition, it should respond with a HTTP 503 response, typically referred to as a "503 Service Unavailable" that can include a retry time, typically provided as a Retry-After header. As a result, the UE should stop the file repair procedure to that file repair server. The UE shall consider this server unavailable for this file repair session, or, if supported by the UE, for the period of time indicated by the retry time e.g. in the Retry-After header, the UE may stop the present file repair procedure and immediately try an alternative available file repair server. The UE may re-try the current file repair server after the retry time has elapsed. In the case that all known file repair servers have been exhausted in this manner, the UE shall cease the file repair procedure. When the retry time is expressed as an integer number of seconds then it may be relative to the reception time of the "503 Service Unavailable".

HTTP response error messages may contain a message body, which gives a more detailed error message. The MIME type of such message body shall be in text/plain. The syntax of the HTTP error message body can be defined as follows:

http-error-body=error-code (SP/HTAB) error-description CRLF
error-code=4DIGIT
error-description=1*(SP/VCHAR)

Figure 9:
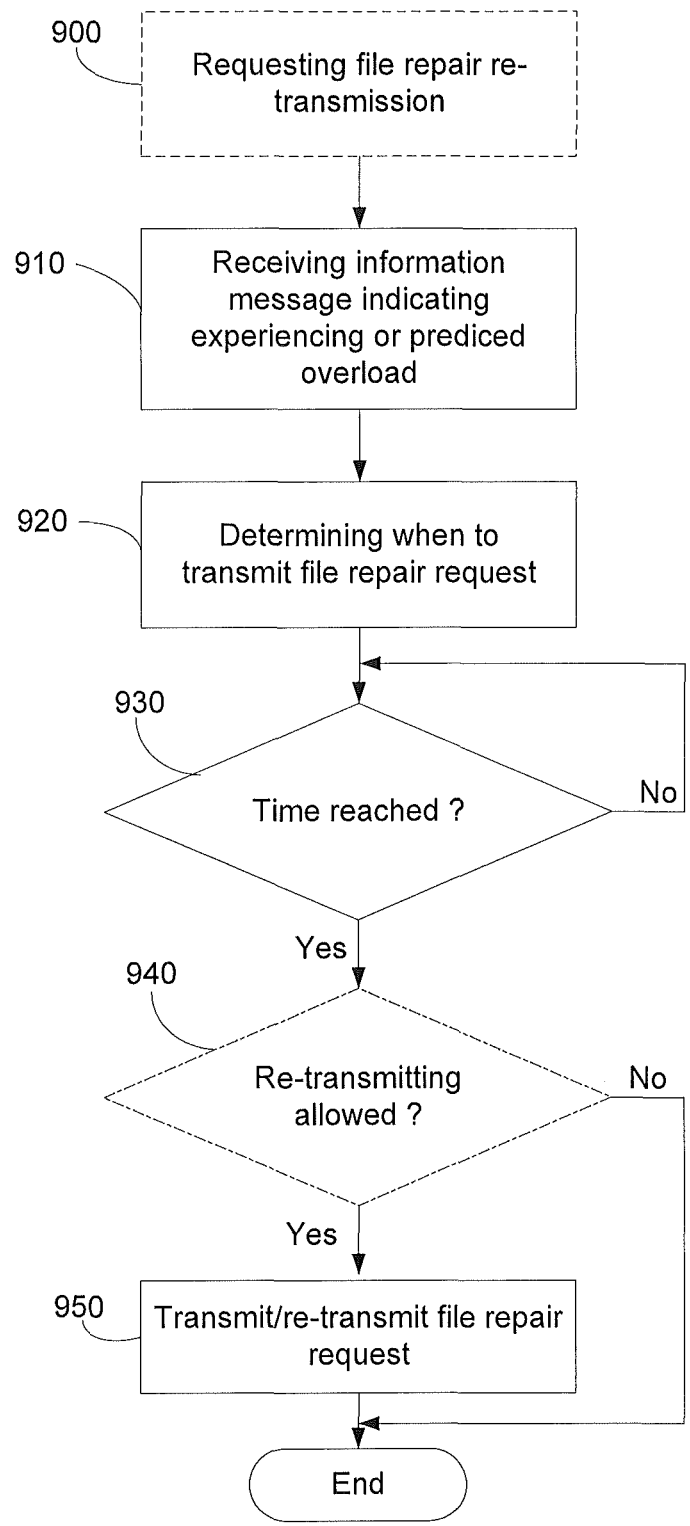
FIG. 9 is a flowchart of a method in a UE for performing a file repair session following a broadcast transmission of a data file from a BM-SC, according to one embodiment.

Note that the following error messages MAY be used in the message body of the HTTP response error messages.
0001 File not found
0002 Content-MD5 not valid
0003 SBN or ESI out of range
0004 ServiceId not found
0005 fdtInstanceId not found
0006 fdtGroupId not found A corresponding method to be executed at a UE for performing a file repair session, as suggested above, is illustrated in FIG. 9. In a step 910, the UE receives an information message indicating overload experienced at, or predicted for, a file repair server of a BM-SC. In case of UE retry, the information message is a response message sent in response to a file repair re-transmission request, indicated with step 900 in FIG. 9. Based on the content of the information message, the UE will at a next step 920 be able to determine when to transmit a file repair request for the indicated file repair server, and will thereby avoid sending requests for a specific file repair server which will not be suitable for providing file repair services for the time being. In a next step 930 it is determined when in time it will be admitted to request the file repair server for file repair, as indicated with step 950, based on content of the information message received in step 910. Optionally, the information message may be able to prohibit re-transmission or transmission of a file repair request, as described in more detail below, in which case the UE may instead request re-transmission or file repair from another file repair server then the one experiencing, or being predicted to experience, overload condition.

The BM-SC may use the prediction algorithm to decide a reasonable retry time T and send the HTTP response to the UE together with T. For overload case (2), one example comprises setting T with the value r1*c2*d2/c4. For overload case (3), one example comprises setting T with value r1*c2*d2/(d3*c5).

With a reasonable time T, the BM-SC may, or will, avoid being overloaded by retry requests from UEs.

After a traffic model module has made an overload prediction for the file repair procedure, it may send an HTTP GET request to each file repair server with a retry time T and then the file repair servers could send T to the UEs.

The following example shows how a file repair server may send retry time T to UEs in the XML body of a HTTP 503 response:
UE→file repair server:

```
GET
/repairService/test.dat&SBN=0;ESI=1-10,20-50&SBN=1&SBN=2-
    3;ESI=1-10 HTTP/1.1
Host: 192.168.018:8001
Accept: */*
File repair server ->UE:
    HTTP/1.1 503 Service Unavailable
    Date: Mon, 11 Jun 2012 03:45:01 GMT
    Content-Length: 200
    Content-Type: application/xml
    <retryTime>5000</retryTime>
```

If the file repair servers do not allow the UEs to perform a retry, they can set retryTime to be 0. In order to spread the retry requests from the UEs over time, each UE which receives T may preferably calculate a random time, typically having a uniform distribution, according to the randomTimeperiod parameter and send a retry request after a randomTimeperiod+T. If a UE finds that T is absent or set to 0 in the HTTP 503 response, it shall not retry a file repair request to the same file repair server for the present file repair procedure, i.e. it shall consider this file repair server unavailable for this file repair session.

There may be multiple file repair procedures which are time overlapped. The burst file repair traffic may, or will, happen in an overlapped time slot and make file repair servers easier to be overloaded. For such cases, it is possible to also predict the traffic of each file repair procedure or session and calculate the total traffic to determine when the burst file repair traffic will happen and if the burst traffic will make servers becoming overloaded.

In short, a traffic model has been disclosed with the same file loss ratio to simulate complicated real traffic of file repair procedure approximately. Based on such a traffic model, this disclosure discloses an algorithm for predicting traffic of a file repair procedure or session in the future. By using such prediction, the BM-SC may know if and when the file repair servers will likely become overload, and will be able to take action to avoid overload by sending an updated ADPD to the UEs or by instructing UEs to wait a reasonable time before they initiates a retry. By using this prediction, the eMBMS system may use file repair server resources more efficiently and greatly improve the user experience.

The above described BC-SC and the method described herein, as well as the UE and the method described herein, have several advantages. (a) The method helps to predict the traffic of the whole file repair procedure or session in a short statistics time at the beginning of the procedure. Because the method use sample data of real traffic for its calculation, the prediction is very close to real traffic. (b) For eMBMS systems with updated ADPD support, the method helps to predict if and when file repair servers will become overloaded before overload really happens. It also helps the BM-SC to set an appropriate randomTimePeriod and to send an updated ADPD to the UEs to avoid overload in advance before an overload occurs. (c) For eMBMS systems without updated ADPD support, it helps the BM-SC to send an appropriate waiting time to UEs to be used for retry and to avoid the BM-SC being overloaded by retry requests sent from UEs, i.e. by re-transmissions of file repair requests.

Figure 10:
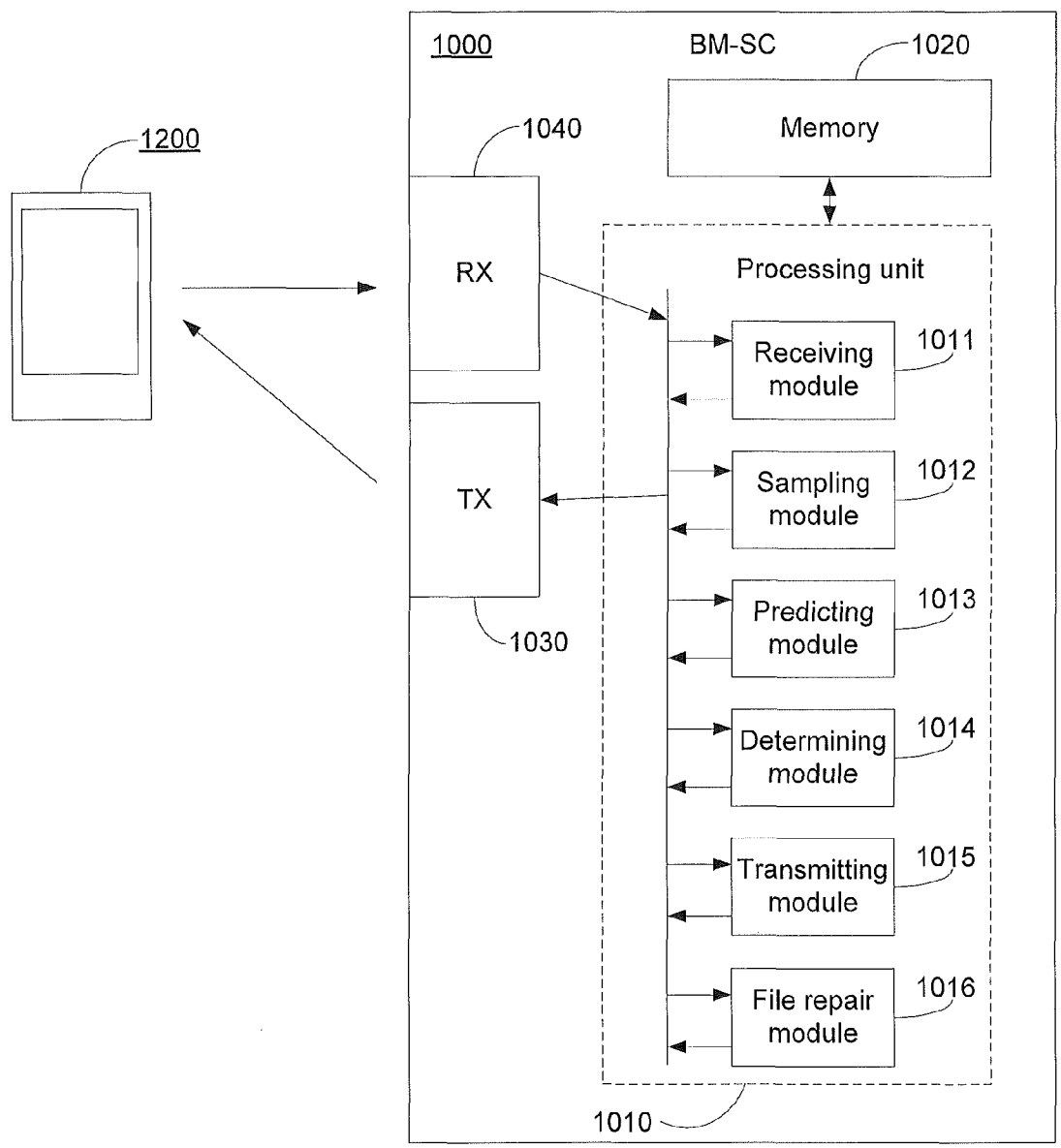
FIG. 10 is an exemplifying block scheme of a BM-SC for performing a file repair session following a broadcast transmission of a data file to at least one UE or MBMS client, in a radio communication system, according to a first embodiment.

In FIG. 10, a BM-SC 1000 is illustrated, which is configured to execute the method according to one or more of the embodiments described above.

BM-SC 1000 comprises a receiving unit (RX) 1040 and a transmitting unit (TX) 1030. Through these communication units, BM-SC 1000 is adapted to communicate with other nodes and/or entities in a wireless communication network (not shown). The receiving unit 1040 may alternatively comprise more than one receiving arrangements. For example, the receiving unit 1040 may be connected to both a wire and an antenna, by means of which the BM-SC 1000 is enabled to communicate with other nodes and/or entities in the wireless communication network. Similarly, the transmitting unit 1030 may alternatively comprise more than one transmitting arrangement, each of which are in turn connected to both a wire and an antenna, by means of which the BM-SC 1000 is enabled to communicate with other nodes and/or entities in the wireless communication network. Since the BM-SC comprises file repair server functionality, separate receiving and transmitting units may be dedicated to such servers. For simplicity reasons only one receiving unit and one transmitting unit is shown in FIG. 10. The BM-SC 1000 further comprises a memory 1020 accessible to the processing unit 1010, for storing data. Further, the BM-SC 1000 is illustrated comprising a processing unit 1010 which may comprise or be connected to a number of different functional modules, here represented by modules 1011-1016, configured to interact with each other, such that the method steps described above are executable. Here the suggested modules are referred to as a receiving module 731, for receiving file repair requests and re-transmission requests from UEs; a sampling module 732, for sampling data according to any of the embodiments described above; a predicting module 733, for predicting when an overload condition is about to occur for a file repair server, a determining module 734, for determining how to configure the information message; a transmitting module 735, for transmitting information messages to respective UEs, and finally a file repair module 1016, where the latter module is configured to provide file repair server functionality for two or more file repair servers. It shall be pointed out that this is merely an illustrative example and that the BM-SC 710 may comprise more, less or other units or modules which are configured to execute the functions of the BM-SC 710 in the same manner as the configuration illustrated in FIG. 10. As already mentioned, the BM-SC is configured to provide file repair server functionality, e.g. such that it can emulate a file repair configuration according to FIG. 6. In other words, when in this disclosure, it is said that a file repair server is communicating with a UE, this is provided by means of relevant functionality provided by the BM-SC, as described herein. However, since details of the file repair server configuration are out of scope of this disclosure, such details have been omitted.

More specifically, the processing unit 1010 of BM-SC 1000 is configured to determine whether a first of its file repair servers is experiencing, or is predicted to experience, an overload condition, and to transmit an information message indicating the existing or predicted overload experience of the first file repair server. In addition, the processing unit 1010 is capable of also indicating a time interval, T, which shall have elapsed before the UE is allowed to transmit a file repair request to the first file repair server, to the UE, via a transmitting unit 1030, in case it is determined that the first file repair server is experiencing, or is predicted to experience, an overload condition.

The processing unit 1010 may further be configured to sample traffic statistics data during a predetermined sampling time period during a file repair session, such that, in case of predicted overload experience, the determining can be executed by predicting on how a total traffic load with regard to file repair will vary during the file repair session, where the predicting is based at least partially on the sampled traffic statistics data.

In case UE retry is applied, the processing unit 1010 may further be configured to receive a file repair request, requesting re-transmission from the first file repair server, from the UE, via a receiving unit 1040. In this case the information message is a response message sent to the UE as a response to the file repair request.

The processing unit 1010 may be configured to configure the response message as a HTTP response message, and more specifically as a 503 error code.

It may be desirable to prohibit UEs from re-transmitting a file repair request to the first file repair server, in which case such UEs will typically instead request re-transmission from an alternative file repair server, which has not been reported to be in, or be predicted to be about to go into, an overload experience, the processing unit 1010 may be configured to either set T to 0, or to remove T from the information message prior to transmitting the information message, in order to indicate such a prohibition to the UE.

The processing unit 1010 may be configured to contain T in a header, here referred to as Retry-After header, of the response message.

In case the BM-SC 1000 is configured to transmit updated ADPDs, instead of, applying UE retry, the processing unit 1010 may be configured to configure the information message as an updated ADPD, and may also be capable of adding T to the ADPD. In such a scenario, T will typically be arranged as a sum of an offset time value T-offset and a random time period value, T-rand, in order to further reduce the risk of future overload when UEs request file repair based on this information.

According to one embodiment, the processing unit 1010 may be configured to determine the number of UEs in need of file repair with regards to a specific transmitted data file based on the number of incoming file repair requests per second, a current value for the random time, T-rand, and the length of the sampling period, T-samp, and to perform the prediction based in this data.

According to another embodiment, the processing unit 1010 may be configured to determine a maximum number of UEs, UE-max, that may be involved in the file repair session simultaneously based on a size of a transmitted data file, an average file loss ratio, an average unicast bitrate that the UE may use to download repair symbols from the file repair server, and the number of incoming file repair requests per second, and to perform the prediction based on this data. More specifically, the processing unit 1010 may be configured to predict that the first file repair server will become overloaded during the file repair session if UE-max exceeds a predetermined threshold.

According to yet another embodiment, the processing unit 1010 may be configured to determine a maximum used bandwidth for the file repair session, based on a size of the transmitted data file, an average file loss ratio, an average unicast bitrate that the UE may use to download repair symbols from the file repair server and the number of incoming file repair requests per second, and to perform the prediction based on this data, wherein the processing unit 1010 may be configured to predict that the file repair server will become overloaded during the file repair session if the maximum used bandwidth for the file repair session exceeds a predetermined threshold.

Alternatively, all or some of the functionality described above may be realized by way of running an executable computer program, comprising computer readable units, which when run on a computer, causes the computer to execute any of the method described above. A computer program product may also be provided which comprises a computer readable medium and the computer program as described above. Such a computer may, form part of a BM-SC, e.g. the computer is capable of emulating conventional BM-SC functionality, as well as the additional functionality as described herein; be connected to a BM-SC, such that the computer contributes with the additional functionality.

Figure 11:
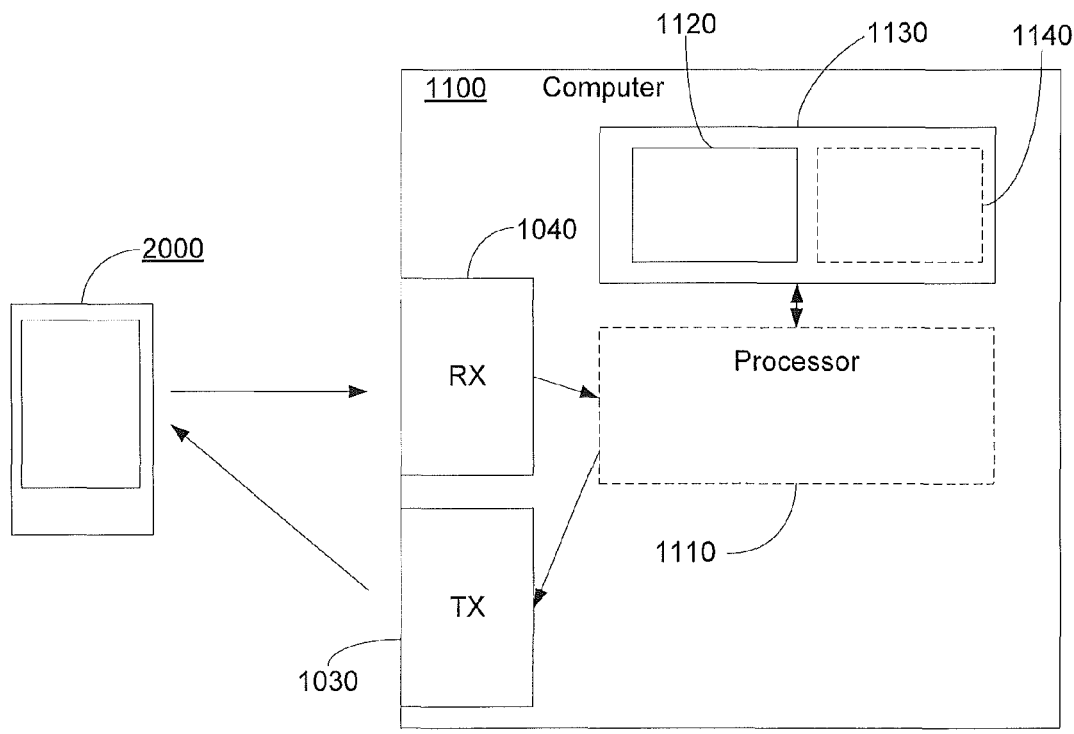
FIG. 11 is an exemplifying block scheme of a BM-SC for performing a file repair session following a broadcast transmission of a data file to at least one UE or MBMS client, in a radio communication system, according to a second embodiment.

FIG. 11 is a schematic diagram showing an alternative BM-SC enabled arrangement, referred to as a computer 1100 comprising a processor 1110 which is capable of executing instructions contained in a computer program 1120 stored in a computer program product 1130, e.g. in the form of a non-volatile or volatile memory, such as e.g. an Electrically Erasable Programmable Read-Only Memory (EEPROM), a flash memory, a Random Access Memory (RAM), or a disc drive, but not in the form of a signal or any form of electromagnetic wave. The computer program product 1130 may also comprise persistent storage 1140, which, for example, can be any single one or combination of magnetic memory, optical memory, solid state memory or even remotely mounted memory.

Figure 12:
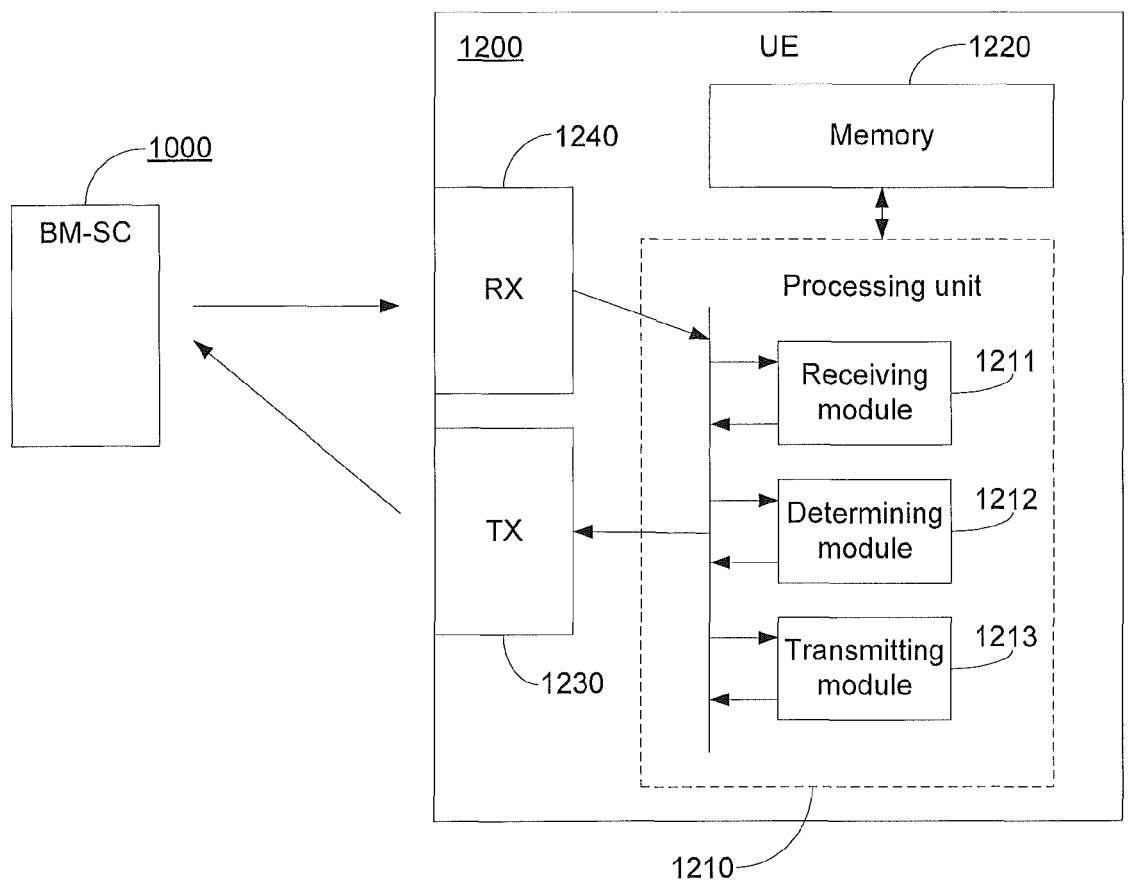
FIG. 12 is an exemplifying block scheme of a UE for performing a file repair session following a broadcast transmission of a data file from a BM-SC, according to a first embodiment.

In FIG. 12, a UE 1200 is illustrated comprising a receiving unit 1240 and a transmitting unit 1230. Through these two communication units, the UE 1200 is adapted to communicate with other nodes and/or entities in a wireless communication network. The receiving unit 1240 may alternatively comprise more than one receiving arrangement. For example, the receiving unit 1240 may be connected to both a wire and an antenna, by means of which the UE 1200 is enabled to communicate with other nodes and/or entities in the wireless communication network. Similarly, the transmitting unit 1230 may alternatively comprise more than one transmitting arrangement, each of which are in turn connected to both a wire and an antenna, by means of which the UE 1200 is enabled to communicate with other nodes and/or entities in the wireless communication network. The UE 1200 further comprises a memory 1220 for storing data. Further, the UE 1200 comprises a processing unit 1210 which in turn may comprise or be connected to a number of different modules configured to interact with each other, such that a method according to any of the embodiments described above is executed. Here such modules are represented by modules 1211-1213, and referred to as a receiving module 1211, for receiving at least information messages from a BM-SC/file repair server, a determining module 1212, for determining how to address file repair servers of the BM-SC, and a transmitting module 1213, for transmitting requests for invoking file repair services from the BM-SC. It shall be pointed out that this is merely an illustrative example and that the UE 1200 may comprise more, less or other units or modules configured to execute functions of the UE in the same manner as the units illustrated in FIG. 12.

The processing unit 1210 of UE 1200 is configured to receive an information message capable of indicating a time interval, T, which shall have elapsed before the UE transmits a file repair request to a first file repair server of the BM-SC, from the BM-SC, via a receiving unit, and to determine when to transmit a file repair request to the first file repair server by considering the content of the information message.

In case UE retry is applied the processing unit 1210 is configured to request re-transmission from the first file repair server, based on T. In such a scenario, the information message is a response message received by the UE as a response to a file repair request, previously sent by the UE.

The processing unit 1210 may be further configured to prohibit re-transmission of a file repair request to the first file repair server if the response message comprises a T-value set to 0, or no T-value at all. In such a situation the processing unit 1210 is typically configured to instead of indicating when to re-transmit a request to a file repair server, indicate to the UE that it should transmit a file repair request to another file repair server than the first file repair server, i.e. a file repair server which is not experiencing, or likely to experience, overload, at least to the knowledge of the UE.

Any of the processing units 1010, 1210 may e.g. be configured as one or more Digital Signal Processors (DSP).

Figure 13:
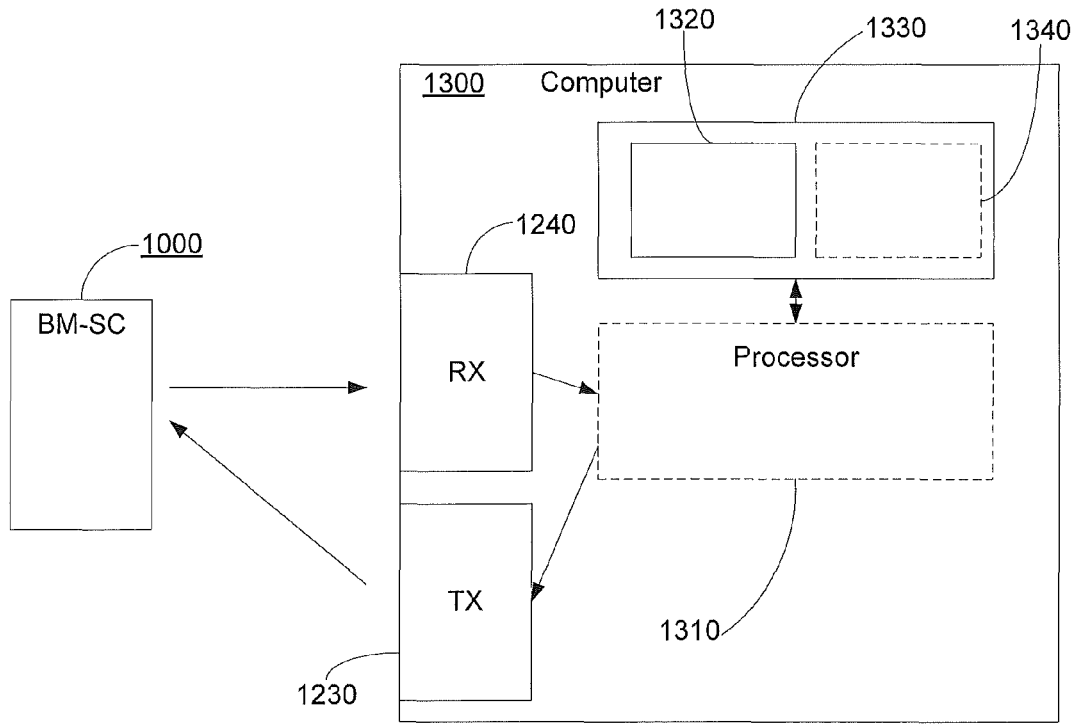
FIG. 13 is an exemplifying block scheme of a UE for performing a file repair session following a broadcast transmission of a data file from a BM-SC, according to a second embodiment.

In resemblance to the BM-SC, also the described UE functionality described above may alternatively be configured as a computer. Such a computer 1300, is illustrated in FIG. 13 and comprise a processor 1310, which is capable of executing instructions contained in a computer program 1320 stored in a computer program product 1330, e.g. in the form of a non-volatile or volatile memory, such as e.g. an Electrically Erasable Programmable Read-Only Memory (EEPROM), a flash memory, a Random Access Memory (RAM), or a disc drive, but not in the form of a signal or any form of electro-magnetic wave. The computer program product 1330 may also comprise persistent storage 1340, which, for example, can be any single one or combination of magnetic memory, optical memory, solid state memory or even remotely mounted memory. Such a computer typically form part of a UE, e.g. the computer is capable of emulating conventional UE functionality, as well as the additional functionality as described herein. Alternatively, the computer is connected to a UE, such that the computer contributes with the additional functionality as described herein.

The computer program may be configured as a computer program code structured in suitable computer program modules, such that when executed it essentially perform the actions of any of the flows illustrated in any of FIGS. 8a-9, to emulate the described BM-SC or UE functionality, respectively. In other words, when the different computer program modules are executed by the respective processor 1110,1310, they may provide functionality corresponding to the functionality provided by modules 1011-1015 of FIG. 10 or 1211-1213 of FIG. 12.

Hence, in an exemplifying embodiment, the code means in the computer program of the BM-SC may comprise e.g. a sampling module for sampling traffic statistics data during a predetermined sampling time period, and a predicting module for predicting, based at least partially on the sampled traffic statistics data, how a total traffic load with regards to file repair will vary until an end of the file repair session. The computer program may also comprise, among other modules, a transmitting module for transmitting, to the at least one UE, an information message in order for the UE to determine a point in time when to re-transmit a file repair request if the prediction indicates that the at least one file repair server will become overloaded during the file repair session.

It should be noted that FIGS. 10 and 12 merely illustrates various functional units and modules in the BM-SC and the UE respectively in a logical sense, where functional units or modules which may be used in a BM-SC or UE, such that e.g. encoding and decoding modules, respectively, but which are not relevant for the understanding of the technical solution presented herein, have been omitted for simplicity reasons. The functions applied may in practice be implemented using any suitable software and/or hardware means/circuits etc. Thus, the embodiments are generally not limited to the shown structures of the BM-SC and the UE respectively and the functional units and modules. Hence, the previously described exemplary embodiments may be realised in many alternative ways. For example, one embodiment may include a respective computer-readable medium having instructions stored thereon that are executable by the respective processor for executing the method steps in the BM-SC and the UE, respectively. The instructions executable by the computing system and stored on the computer-readable medium perform the method steps as described above.

Although the code means in any of the embodiments disclosed above in are implemented as computer program modules which when executed in the processing unit of the BM-SC or UE causes the BM-SC or UE to perform the actions described above in the conjunction with figures mentioned above, at least one of the code means may in alternative embodiments be implemented at least partly as hardware circuits.

Any of the suggested processor or processing unit may include one or more general purpose microprocessors; instruction set processors and/or related chips sets and/or special purpose microprocessors, such as one or more ASICs (Application Specific Integrated Circuit), which may also comprise board memory for caching purposes.

The processing unit of the BM-SC may alternatively be described such that is comprises software or hardware configured modules, which when interacting with each other causes the BM-SC to execute the method as described above.

A determining module may be configured to determine an overload situation according to step 810 as illustrated in FIG. 8a or 8b, while the transmitting unit is operatively connected to the determining module so that it is capable of transmitting information according to step 830 accordingly. In addition, the receiving unit is operatively connected to the processor, such that it can receive a file repair request, which can be processed accordingly by the processor. A sampling module may be configured to provide sample statistics data to the determining module.

Correspondingly, the processing unit of the UE may be described as comprising software or hardware configured modules, which when interacting with each other causes the UE to execute the method as described above.

More specifically, a determining module may be configured to transmit a file repair request, as indicated with step 920 in FIG. 9, upon receiving an information message via the receiving unit, operatively connected to the processor.

It is to be understood, that although examples given herein may be referring to eMBMS enabled networks, the methods and arrangements disclosed herein may likewise be applicable to MBMS enabled networks.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a Broadcast Multicast Service Centre, BM-SC, comprising at least two file repair servers for performing a file repair session following a broadcast transmission of a data file to a User Equipment, UE, in a radio communication system, the method comprising:
   determining whether a first file repair server of the at least two file repair servers is experiencing, or is predicted to experience, an overload condition, and
   transmitting, to the UE, an information message indicating that the first file repair server is experiencing or predicted to experience the overload condition and indicating a time interval, T, which shall have elapsed before the UE is allowed to transmit a file repair request to the first file repair server, in response to the determining that the first file repair server is experiencing, or is predicted to experience, the overload condition,
   wherein T is set to 0 to indicate to the UE to avoid re-transmitting a file repair request to the first file repair server.

2. The method according to claim 1, further comprising:
   sampling traffic statistics data during a predetermined sampling time period during a file repair session, and
   wherein, in case of predicted overload experience, the determining comprises predicting, based at least partially on the sampled traffic statistics data, how a total traffic load with regard to file repair will vary during the file repair session.

3. The method according to claim 1, further comprising:
   receiving from the UE, a file repair request requesting re-transmission from the first file repair server,
   wherein the information message is a response message sent to the UE as a response to the file repair request.

4. The method according to claim 1, wherein the information message is a HTTP response message indicating a number of file repair requests that have been received.

5. The method according to claim 3, wherein the information message is a HTTP response message comprising a 503 error code.

6. The method according to claim 1, wherein T is contained in a header, Retry-After header, of the response message.

7. The method according to claim 1,
   wherein the information message is an updated Associated Delivery Procedure Description, ADPD, including T, and
   wherein T comprises a sum of an offset time value, T-offset, and a random time period value, T-rand.

8. The method according to claim 7, wherein the determining comprises determining the number of UEs in need of file repair with regards to the transmitted data file based on the number of incoming file repair requests per second, a current value for a random time, T-rand, and a length of the sampling period, T-samp, and performing the predicting based in this data.

9. The method according to claim 7, wherein the determining further comprises determining a maximum number of UEs, UE-max, that may be involved in the file repair session simultaneously based on a size of the transmitted data file, an average file loss ratio, an average unicast bitrate that the UE may use to download repair symbols from the file repair server or the number of incoming file repair requests per second, and to perform the prediction based on this data.

10. The method according to claim 9, wherein the determining further comprises predicting that the first file repair server will become overloaded during the file repair session if UE-max exceeds a predetermined threshold.

11. The method according to claim 7, wherein the determining further comprises determining a maximum used bandwidth for the file repair session based on a size of the transmitted data file, an average file loss ratio, an average unicast bitrate that the UE may use to download repair symbols from the file repair server or the number of incoming file repair requests per second, and to perform the prediction based on this data.

12. The method according to claim 11, wherein the determining further comprises predicting that the first file repair server will become overloaded during the file repair session if the maximum used bandwidth for the file repair session exceeds a predetermined threshold.

13. A method in a User Equipment, UE, for performing a file repair session following a broadcast transmission of a data file from a Broadcast Multicast Service Centre, BM-SC, the method comprising:
   receiving, from the BM-SC, an information message indicating that a first file repair server is experiencing or predicted to experience an overload condition and a time interval, T, which shall have elapsed before the UE transmits a file repair request to the first file repair server of the BM-SC, and
   determining based on T, when to transmit a file repair request to the first file repair server,
   wherein the information message is an Associated Delivery Procedure Description, ADPD, comprising T, and
   wherein T comprises a sum of an offset time value, T-offset, and a random time period value, T-rand.

14. The method according to claim 13, further comprising:
   requesting re-transmission from the first file repair server, wherein the information message is a response message received by the UE as a response to the file repair request.

15. The method according to claim 13, further comprising:
   avoiding to re-transmit a file repair request to the first file repair server if the response message comprise a T-value set to 0.

16. A Broadcast Multicast Service Centre, BM-SC, comprising at least two file repair servers configured to perform a file repair session following a broadcast transmission of a data file to a User Equipment, UE, in a radio communication system, the BM-SC comprising a processor, the BM-SC configured to perform operations comprising:
   determining, by the processor, whether a first of said file repair servers is experiencing, or is predicted to experience, an overload condition, and
   transmitting, by a transmitter, to the UE, an information message indicating the existing or predicted overload experience of the first file repair server and capable of indicating a time interval, T, which shall have elapsed before the UE is allowed to transmit a file repair request to the first file repair server, in response to the determining that the first file repair server is experiencing, or is predicted to experience, an overload condition,
   wherein the operations further comprise setting T to 0, thereby indicating to the UE to avoid re-transmitting a file repair request to the first file repair server.

17. The BM-SC according to claim 16, wherein the operations further comprise:

sampling traffic statistics data during a predetermined sampling time period during a file repair session, and wherein, in case of predicted overload experience, the determining comprises predicting, based at least partially on the sampled traffic statistics data, on how a total traffic load with regard to file repair will vary during the file repair session.

18. The BM-SC according to claim 16, wherein the operations further comprise:
receiving, via a receiver, from the UE, a file repair request requesting re-transmission from the first file repair server, and wherein the information message is a response message sent to the UE as a response to the file repair request.

19. The BM-SC according to claim 16, wherein information message is a HTTP response message indicating a number of file repair requests that have been received.

20. The BM-SC according to claim 16, wherein information message is a HTTP response message comprising a 503 error code.

21. The BM-SC according to claim 16, wherein the operations further comprise containing T in a header, Retry-After header, of the response message.

22. The BM-SC according to claim 16, wherein the information message as is an updated Associated Delivery Procedure Description, ADPD, including T, wherein T comprises a sum of an offset time value, T-offset, and a random time period value, T-rand.

23. The BM-SC according to claim 22, wherein the operations further comprise determining the number of UEs in need of file repair with regards to the transmitted data file based on the number of incoming file repair requests per second, a current value for the random time, T-rand, or the length of the sampling period, T-samp, and to perform the prediction based in this data.

24. The BM-SC according to claim 22, wherein the operations further comprise determining a maximum number of UEs, UE-max, that may be involved in the file repair session simultaneously based on a size if the transmitted data file, an average file loss ratio, a average unicast bitrate that the UE may use to download repair symbols from the file repair server or the number of incoming file repair requests per second, and to perform the prediction based on this data.

25. The BM-SC according to claim 24, wherein the operations further comprise predicting that the first file repair server will become overloaded during the file repair session if UE-max exceeds a predetermined threshold.

26. The BM-SC according to claim 25, wherein the operations further comprise determining a maximum used bandwidth for the file repair session based on a size of the transmitted data file, an average file loss ratio, an average unicast bitrate that the UE may use to download repair symbols from the file repair server or the number of incoming file repair requests per second, and to perform the prediction based on this data.

27. The BM-SC according to claim 26, wherein the operations further comprise predicting that the first file repair server will become overloaded during the file repair session if the maximum used bandwidth for the file repair session exceeds a predetermined threshold.

28. A User Equipment, UE, for performing a file repair session following a broadcast transmission of a data file from a Broadcast Multicast Service Centre, BM-SC, the UE comprising a processor, the UE configured to perform operations comprising:
receiving, from the BM-SC, by a receiver in communication with the processor, an information message indicating that a first file repair server is experiencing or predicted to experience an overload condition and a time interval, T, which shall have elapsed before the UE transmits a file repair request to the first file repair server of the BM-SC;
determining by the processor, based on T, when to transmit a file repair request to the first file repair server;
avoiding to re-transmit a file repair request to the first file repair server if the response message comprises a T-value set to 0.

29. The UE according to claim 28, the operations further comprise:
requesting re-transmission from the first file repair server, wherein the information message is a response message received by the UE as a response to the file repair request.

30. A computer program product for performing a file repair session following a broadcast transmission of a data file to a User Equipment, UE, the computer program product comprising a non-transitory computer readable medium on which a computer program is stored, the computer program comprising computer readable code units which when run on a computer causes the computer to perform operations comprising:
determining whether a first file repair server of the at least two file repair servers is experiencing, or is predicted to experience, an overload condition, and
transmitting to the UE, an information message indicating that the first file repair server is experiencing or predicted to experience the overload condition and indicating a time interval, T, which shall have elapsed before the UE is allowed to transmit a file repair request to the first file repair server, in response to the determining that the first file repair server is experiencing, or is predicted to experience, the overload condition,
wherein the operations further comprise setting T to 0, thereby indicating to the UE to avoid re-transmitting a file repair request to the first file repair server.

31. A computer program product for performing a file repair session following a broadcast transmission of a data file from a Broadcast Multicast Service Centre, BM-SC, the computer program product comprising a non-transitory computer readable medium on which a computer program is stored, the computer program comprising computer readable code units which when run on a computer causes the computer to perform operations comprising:
receiving, from the BM-SC, via a receiver, an information message indicating that a first file repair server is experiencing or predicted to experience an overload condition and a time interval, T, which shall have elapsed before the UE transmits a file repair request to the first file repair server of the BM-SC, and
determining based on T, when to transmit a file repair request to the first file repair server,
wherein the information message is an Associated Delivery Procedure Description, ADPD, comprising T, and wherein T comprises a sum of an offset time value, T-offset, and a random time period value. T-rand.

* * * * *